(12) United States Patent
Riepling (10) Patent No.: US 12,117,513 B2
(45) Date of Patent: Oct. 15, 2024

(54) ENVIRONMENTALLY AWARE REMOTE CONTROL

(71) Applicant: Roku, Inc., San Jose, CA (US)

(72) Inventor: Eric Casten Riepling, Soquel, CA (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 17/332,353

(22) Filed: May 27, 2021

(65) Prior Publication Data

US 2022/0381892 A1 Dec. 1, 2022

(51) Int. Cl.
*G01S 11/14* (2006.01)
(52) U.S. Cl.
CPC ..................... *G01S 11/14* (2013.01)
(58) Field of Classification Search
CPC ....................................................... G01S 11/14
See application file for complete search history.

(56) References Cited

U.S. PATENT DOCUMENTS

| | | | |
|---|---|---|---|
| 9,749,700 B1 | 8/2017 | Hollinger | |
| 9,753,129 B2 * | 9/2017 | Borggaard | G01S 5/186 |
| 2014/0064034 A1 * | 3/2014 | Zhang | G01S 11/14 |
| | | | 367/127 |
| 2015/0219755 A1 * | 8/2015 | Borggaard | G01S 5/30 |
| | | | 367/118 |
| 2021/0314699 A1 * | 10/2021 | Stahl | G10L 25/06 |

FOREIGN PATENT DOCUMENTS

CN 112098948 A * 12/2020

* cited by examiner

*Primary Examiner* — Luke D Ratcliffe
*Assistant Examiner* — Abdallah Abulaban
(74) *Attorney, Agent, or Firm* — Sterne, Kessler, Goldstein & Fox P.L.L.C.

(57) ABSTRACT

Disclosed herein are system, apparatus, article of manufacture, computer-implemented method, and/or computer-program product (computer-readable non-transitory storage medium) embodiments, and/or combinations and sub-combinations thereof, for an environmentally aware remote control. An example embodiment operates by at least one processor detecting a first signal and a second signal and receiving information corresponding to at least a physical position where a user is located relative to at least the first physical source. The at least one processor may further operate by calculating a time difference between a given sample of the first signal and a corresponding sample of a second signal at the physical position where the user is located, and adjusting a relative timing of the first signal with respect to the second signal. In some further embodiments, the at least one processor may adjust other attributes of either signal besides timing, e.g., audio characteristics such as volume, pitch, other filtering, etc.

22 Claims, 6 Drawing Sheets

ENVIRONMENTALLY AWARE REMOTE CONTROL

CROSS-REFERENCE TO RELATED APPLICATIONS

This application is related to U.S. patent application Ser. No. 17/332,342, filed May 27, 2021, now U.S. Pat. No. 11,670,161, issued Jun. 6, 2023 titled "Remote Control System for Improving Target Specificity," the entirety of which is herein incorporated by reference for all purposes.

BACKGROUND

Field

This disclosure is generally directed to audio or audiovisual systems, and more particularly to systems that monitor and respond to their surroundings.

Background

Sound systems, such as high-fidelity or high-definition audio systems including one or more audio channels and loudspeakers or loudspeaker arrays configured for use in homes or businesses, may be installed or operated in environments or conditions that lead to degraded performance. Such degraded performance may take the form of sound quality that is less than what the systems or loudspeakers were designed for, or sound attributes that may be undesirable with respect to a user's preferences as reflected in the user's configuration or other settings for a given system or loudspeaker(s). Degraded sound quality or undesirable sound attributes may result from the space or room(s) around a given sound system.

When such sound systems are used as part of an entertainment system, as part of an audiovisual system such as a television set (TV set), home theater, hospitality or public entertainment venue, etc., system performance may be degraded in other additional ways, such as delay or desynchronization between audio and video, interference from other systems, etc. Such other degradations of performance may also result from surroundings of an entertainment system.

Existing systems may allow for calibration of audio or video to adjust for or mitigate such performance degradation. However, conventional calibration techniques may require considerable effort by users, who may also need to invest in specialized equipment dedicated to calibration. Additionally, conventional calibration techniques may not account for system surroundings or user positioning, and such techniques do not adapt to changing environments or user positioning, or changing sound attributes or audiovisual synchronization.

SUMMARY

Provided herein are system, apparatus, device, article of manufacture, computer-implement method and/or computer-program product (non-transitory computer-readable storage medium) embodiments, and/or combinations and sub-combinations thereof, for an environmentally aware remote control, audio system, and/or audiovisual system improving issues of performance and calibration discussed above, while reducing or eliminating any additional effort required by users to perform or maintain calibration for desired settings.

According to some embodiments, at least one computer processor, via at least one sensor, may be configured to detect signals comprising a first signal and a second signal. The first signal may be detected from at least a corresponding first acoustic wave from at least a first physical source. In some further embodiments, the at least one computer processor may be further configured to receive information corresponding to at least a physical position where a user or apparatus is located relative to the first physical source.

The at least one computer processor may be further configured to calculate or evaluate a time difference between a given sample of the first signal and a corresponding sample of a second signal at the physical position where the user or the apparatus is located, based at least in part on the information corresponding to at least the physical position where the user is located relative to the first physical source. Responsive to the time difference (or evaluation or calculation thereof), the at least one processor may adjust, or transmit one or more instructions for adjusting, a relative timing of the first signal with respect to the second signal, at the physical position where the user or apparatus is located.

In some embodiments, the second signal may include a second acoustic wave corresponding to a second physical source, and the second acoustic wave may have a waveform of similar shape as that of the first acoustic wave. Additionally, or alternatively, the second signal may include an electromagnetic wave corresponding to a second physical source. The second physical source may be coupled with the first physical source, in some further embodiments.

For example, the first physical source may be at least one loudspeaker, and the second physical source may be at least one emitter of the electromagnetic wave, which may be a radio-frequency signal, infrared or ultraviolet light, visible light, or other radiation projection. In some further example use cases, visible light as at least part of the second signal, may be emitted or transmitted, by or through at least one display element, as the second physical source of the second signal.

In some embodiments, a first timing of the first signal may be adjustable independently of a second timing of the second signal. Accordingly, and the adjusting (or the one or more instructions for adjusting) the relative timing of the first signal with respect to the second signal may be configured to shift the first timing. For example, the first and second signals may be from separately controllable audio and video streams, respectively.

Moreover, in some embodiments, the information corresponding to at least a physical position where a user or apparatus is located may further correspond to data quantifying a room in which the user is located. The data may quantify multiple rooms and/or multiple users in one or more rooms, for example.

Additionally, or alternatively, the information may include data from at least one of a rangefinder or an indoor positioning system, quantifying the physical position where the user is located, physical properties of a room in which the user is located, or a combination thereof, among other possible non-limiting examples. Further still, additionally, or alternatively, the information corresponding to physical position where the user is located may be estimated based at least in part on a location of a remote-control device.

According to some embodiments, in addition to, or instead of, receiving, calculating, evaluating, or adjusting, a relative timing of the first signal with respect to the second signal, other parameters may be monitored and/or adjusted, including audio volume adjustment (e.g., normalization or attenuation for preferred ranges that may be predetermined or configured by a user), audio filtering (e.g., frequency response or pitch characteristics for ranges that may be predetermined, configured by a user, or set in response to content metadata corresponding to desired ranges of audio parameters, also with respect to a room in which may be located at least a first physical source of a first acoustic wave, and/or with respect to one or more adjacent rooms or nearby rooms in which the first acoustic wave may be audible above a given volume threshold without the audio volume adjustment, audio filtering, or a combination thereof).

Other embodiments, features, and advantages of the invention will be, or will become, apparent to one with skill in the art upon examination of the following detailed description and accompanying drawings/figures. It is intended that all such additional embodiments, features, and advantages be included within this description, be within the scope of this disclosure, and be protected by the claims that follow.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number may identify the drawing in which the reference number first appears.

DETAILED DESCRIPTION

Provided herein are system, apparatus, device, method and/or computer program product (non-transitory computer-readable storage medium) embodiments, and/or combinations and sub-combinations thereof, for a remote-control device and corresponding system(s) configured to monitor and respond to surroundings, such as by calibration of timing or other properties of audio or audiovisual output, for example.

A remote-control device or corresponding system may control the operations of one or more other devices, including devices for streaming or playback of multimedia content. According to some embodiments, the remote-control device and/or corresponding system may control the operations of devices such as, but not limited to, audio systems, television sets, home theater installations, set-top boxes, optical disc (e.g., Blu-ray Disc, etc.) players, video players, audio/video receivers, game consoles, electronic climate-control devices, digital cameras, camera flashes or other lights, motorized shades, door openers, or the like. These devices are provided as examples and the remote control embodiments of this disclosure may be used to control the operations of other devices.

As discussed in more detail below, the remote-control devices and corresponding systems of this disclosure may use, for example, any of various sensors to detect audio, visual, or other signals via physical phenomena (e.g., acoustic waves, electromagnetic radiation, etc.) in the physical space surrounding the given remote-control device or system. Additionally, a given remote-control device and any corresponding system may perform various processing operations according to enhanced techniques described elsewhere herein. Moreover, a remote-control device or corresponding system may further observe and/or interact with one or more systems in a multi-system environment, and may adjust the output or other behavior of one or more systems, in accordance with the observations, interactions, and/or processing operations according to enhanced techniques described elsewhere herein.

Figure 1:
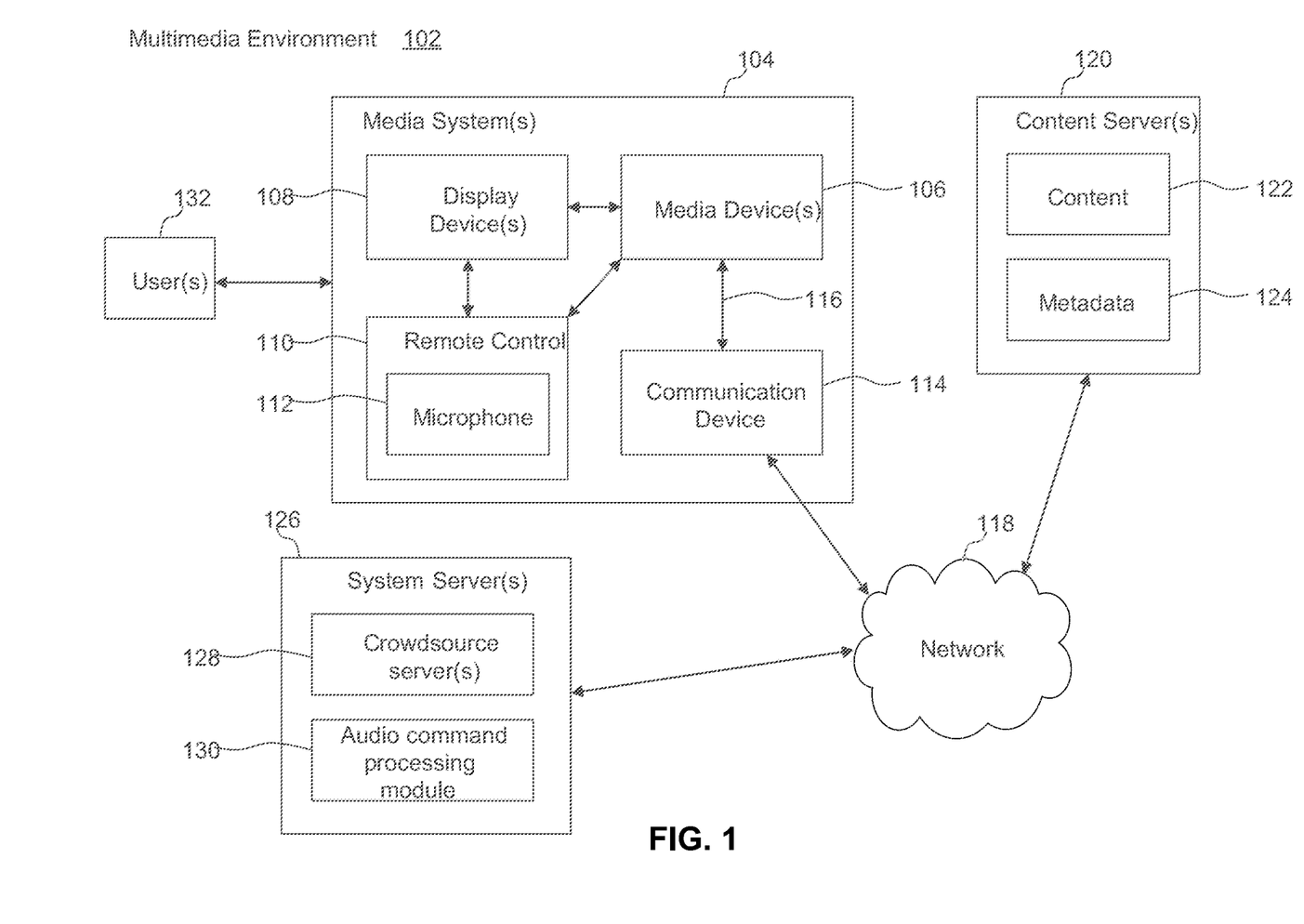
FIG. 1 illustrates a block diagram of a multimedia environment, according to some embodiments of this disclosure.

The remote control embodiments of this disclosure may be implemented in a multimedia environment 102 shown in FIG. 1. For example, various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102 that includes the remote control embodiments of this disclosure, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, Digital Video Disc (DVD) or Blu-ray Disc (BD) device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 may be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (for example, a wireless local area network (WLAN) such as Wi-Fi) and/or wired connections.

In various embodiments, the network 118 may include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 may be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below. According to some embodiments, remote control 110 may include one or more of the remote control embodiments as discussed in more detail below with respect to FIGS. 3-6.

The multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 includes data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes (not shown) of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie. This crowdsourcing example is described, for example, in U.S. Pat. No. 9,749,700 filed Nov. 21, 2016 and titled "Automatic Display of Closed Captioning Information."

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
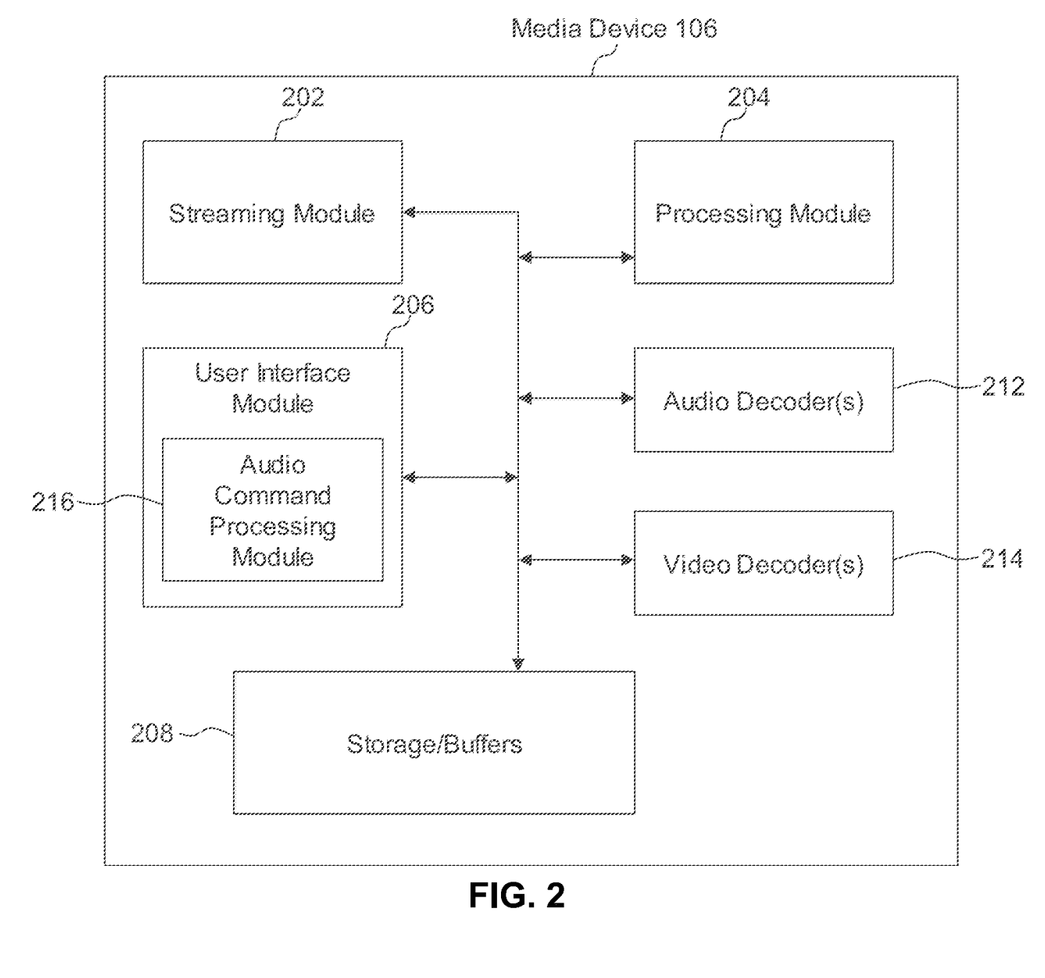
FIG. 2 illustrates a block diagram of a device for streaming or playback of various media, according to some embodiments of this disclosure.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 108 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Example Multi-System Environment

Figure 3:
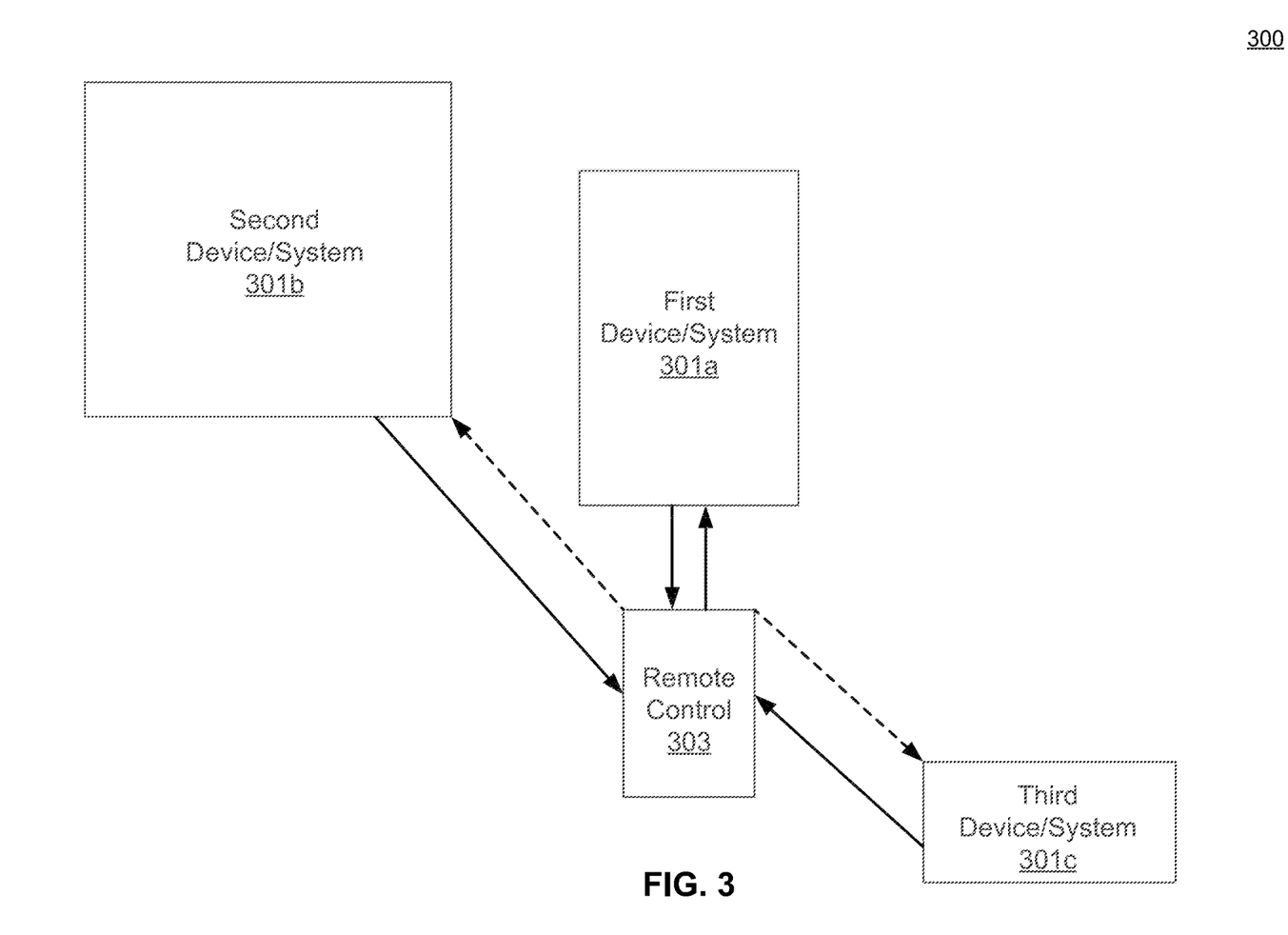
FIG. 3 illustrates another example environment for operating a remote-control device with multiple systems (physical sources of audio signals or other signals), according to some embodiments of this disclosure.

As discussed above, the remote control system of this disclosure may be part of multimedia environment 102 of FIG. 1 (e.g., remote control 110 of FIG. 1). FIG. 3 illustrates another example environment 300 for operating the remote control system, according to some embodiments of this disclosure. As illustrated in FIG. 3, environment 300 may include devices/systems 301a-301c. Devices/system 301a-301c may include, but are not limited to, any arrangement or combination of television sets, set-top boxes, cable boxes, DVD/BD players, home-theater setups, other video players, audio/video receivers, game consoles, digital video recorder (DVR) devices, general-purpose computers, smart phones, tablets, wearable devices (such as a watch or glasses), appliances, Internet-of-Things (IoT) devices, projectors, electronic climate-control devices, digital cameras, camera flashes or other lights, motorized shades, door openers, or the like. In some embodiments, devices/systems 301a-301c may include homogeneous devices or systems (e.g., same or similar kind of devices or systems). These devices or systems are provided as examples and may include other devices or systems.

In some embodiments, one or more of the example devices/systems 301a-301c may be associated with the remote control 303. For example, remote control 303 may be configured to control operations of first device/system 301a using first remote-control codes, and may be configured to control operations of second device/system 301b using second remote-control codes different from the first remote-control codes, allowing for independent control of first device/system 301a versus second device/system 301b or third device/system 301c, as indicated by the broken-line arrows in FIG. 3.

In this use case, any controllable device/system, including first device/system 301a, as well as second device/system 301b or third device/system 301c, may be controlled in a suitable manner in order to mitigate any degradation of performance that may arise from multiple devices/systems operating in the same environment 300. Moreover, remote control 303 may observe, e.g., using one or more sensors and/or processing capabilities, any or all of the surrounding devices/systems 301 observable in a given environment, such as is depicted by the solid-line arrows pointing toward remote control 303.

Alternatively, remote control 303 may be configured to observe at least one second device/system 301b, third device/system 301c, or other device/system, but may be configured to control first device/system 301a, without having permission or ability to control certain other devices/systems including second device/system 301b or third device/system 301c, as indicated by the broken-line arrows in FIG. 3. In this use case, first device/system 301a may be controlled (e.g., in a different manner from control as mentioned in the previously described use case in the paragraph above) in a suitable manner in order to mitigate any degradation of performance that may arise from multiple devices/systems operating in the same environment 300.

In some further example embodiments, any of the observable or controllable devices/systems 301 may be located in a same room or different rooms or floors of a building, for example, or may have other barriers between some devices/systems 301 and/or remote control 303, so as to dampen, deflect, or reflect acoustic waves in various specific patterns, or at various specific frequencies or frequency ranges, for example. Remote control 303, and any corresponding processing capabilities, may be configured to detect a location of at least one person (user), a physical source of an acoustic wave or electromagnetic wave, at least one surface (e.g., wall, ceiling, floor, furniture, etc., of any texture), such as using at least one sensor, such as a camera, rangefinder, or a combination thereof, to scan the surroundings of the given device. may include any variety of proximity sensor, e.g., SONAR, RADAR, LIDAR, or similar time-of-flight (ToF) measurement or detection of specific objects, or a scanning map of surrounding objects and/or terrain, any accessory to a smart TV or game console having similar or equivalent functionality, or any combination thereof, to name a few non-limiting examples.

According to some embodiments, remote control 303 may include an IR remote control system. Remote control 303 may control operations of at least one of devices/systems 301a-301c using remote control codes sent, e.g., through IR radiation beam (projection), or via radio-frequency signals, which may additionally include directional projections, according to some embodiments. As discussed in more detail below, IR remote control 303 may use an optical controller to control and/or adjust one or more parameters associated with IR radiation beam (or other electromagnetic-wave emission) before it is emitted to any or all of devices/systems 301a-301c configured to be controlled by remote control 303.

In some embodiments, remote control 303 may include an IR-to-RF (radio frequency) translator. In this example, the IR-to-RF translator may receive the IR radiation beam generated by remote control 303 and may determine a control signal associated with the IR radiation beam. The IR-to-RF translator may then generate an RF signal based on the control signal to be transmitted to the device/system being controlled (e.g., first device/system 301a) by remote control 303. The IR-to-RF translator may include, or be coupled to, a transceiver to transmit the RF signal to the device that is being controlled. The RF signal may include a Bluetooth™ signal, a WLAN communication signal, a peer-to-peer signal, an RF signal associated with 3G, 4G, Long-Term Evolution (LTE), 5G, or 5G-NR (new radio), 6G, other standard or non-standard equivalents, or the like.

Any device/system 301 that is being controlled by remote control 303 may include an RF receiver configured to receive the RF signal from remote control 303. In this example, a parameter of the IR radiation beam (e.g., the frequency or the frequency range) is translated using the IR-to-RF translator of remote control 303.

According to some embodiments, an on-board controller (e.g., optical controller of an IR-capable device) of remote control 303 may include a plurality of components where one (or a set of) the plurality of components may be used to control/adjust one of a plurality of parameters associated with IR radiation beam or comparable electromagnetic projection. The controller may be part of remote control 303. Alternatively, the controller may be an add-on to remote control 303, e.g., to construct an IR remote control, in some use cases.

Although FIG. 3 illustrates three devices/systems 301a-301c as being three separate devices/systems, the embodiments of this disclosure are not limited to this example. For example, each of devices 301a-301c may be a component (e.g., a sensor) on one device to be controlled by same or different remote control(s). Additionally, there may be multiple remote control 303 devices or systems configured to interact with any number of the devices/systems 301 the likes of those depicted in FIG. 3. Additionally, or alternatively, any other number of devices/systems 301 may be used instead of the three depicted in the non-limiting example of FIG. 3.

Moreover, devices/systems 301 may be attached and communicatively coupled with, or physically integrated with, at least one element configured to become a physical source of acoustic waves (e.g., loudspeaker(s) or equivalent), a light wave (e.g., electric light, lamp, light-emitting diode, display, or corresponding backlight, etc.), or other type of emitter for electromagnetic radiation (e.g. radio-frequency projection or signal, etc.). The physical outputs of these sources may be observed, processed, and responded to accordingly by remote control 303 in an automated fashion, with limited to no interaction by a user, according to some use cases and configurations of remote control 303.

Figure 5:
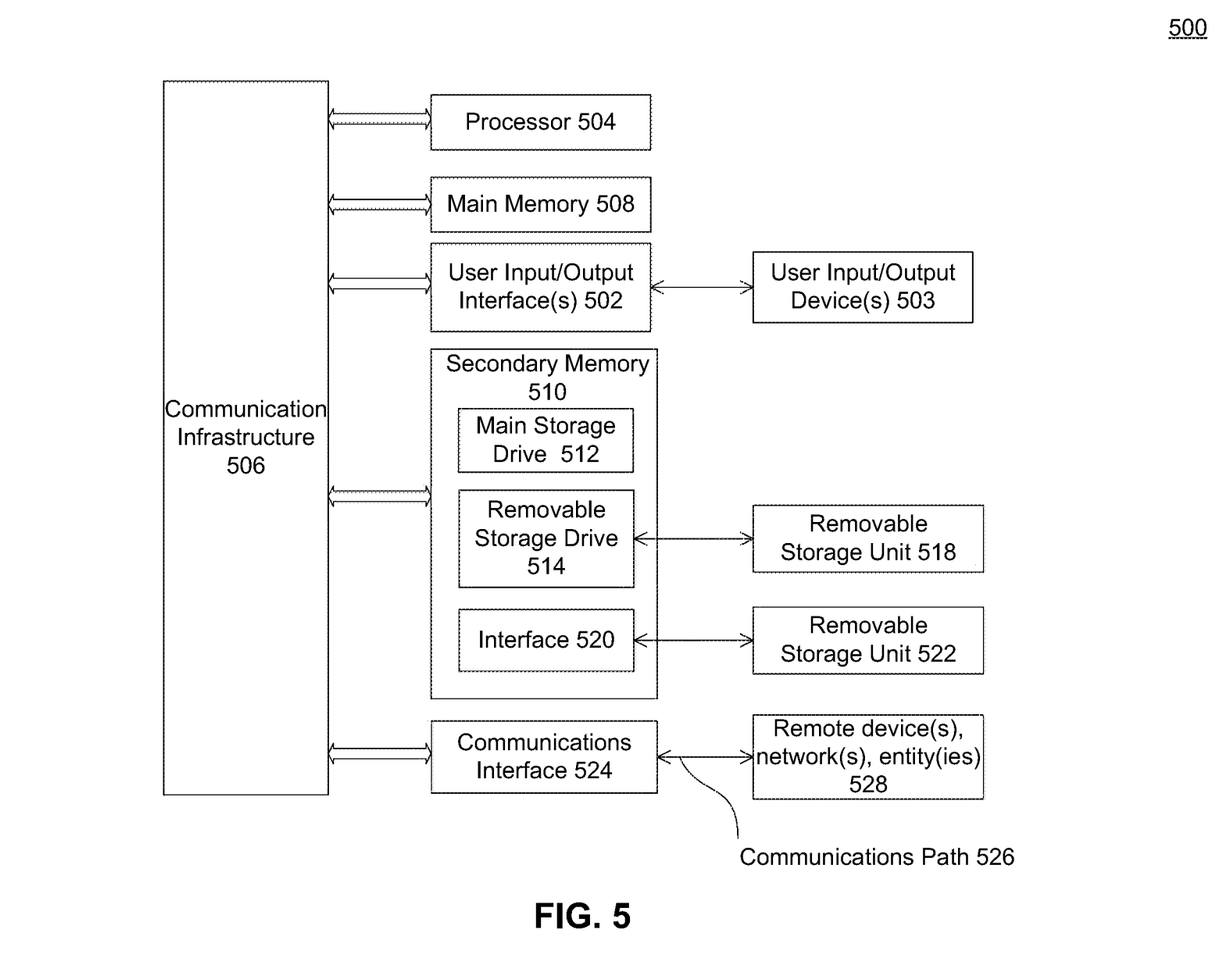
FIG. 5 is a block diagram of an example computer system useful for implementing various embodiments of the present disclosure.

Remote control 303, or any controller component thereof, may include at least one processor device, such as processor 504 of FIG. 5, in addition to one or more sensors, one or more radiation sources/emitters, or may include additional or fewer components, according to some example embodiments. In some use cases, where remote control 303 is configured accordingly, a user may interact with remote control 303 using a user interface (UI) or one or more UI modules.

In some embodiments, a UI module may include (or be connected to) a keyboard, a dial, a slider, or the like, that the user may use to operate remote control 303. Additionally, or alternatively, a UI module may include (or be connected to) a touchpad, a touchscreen, or the like that the user may use to operate remote control 303. Additionally, or alternatively, a UI module may include (or be connected to) a microphone and an audio command processing module, or the like, that the user may use to operate remote control 303 by voice commands or other audible signals. Additionally, or alternatively, a UI module may include (or be connected to) a gesture-detection system configured to detect gestures by the user as intended for operating remote control 303.

A UI module may include (or be connected to) other components to receive the user's commands. For example, in some embodiments, user interface module 402 may include a radio receiver (or transceiver) configured to receive and/or send an RF signal. In at least one embodiment, the transceiver can send and/or receive a signal via physical media other than RF. A signal for communication to or from the remote control 303 can be sent or received via at least one acoustic wave, at frequencies or frequency ranges that may include ultrasonic frequencies (ultrasound) above the range of normal human hearing.

To handle RF signals for communication, for example, user interface module 402 may include a Bluetooth receiver (or transceiver), a WLAN receiver (or transceiver), a cellular receiver, or the like, configured to receive RF signals. In this embodiment, remote control 303 may receive the RF signal and convert the RF signal to an optical radiation beam (e.g., an IR radiation beam), translating control signal(s) accordingly. Additionally, or alternatively, control signals may be used with non-RF carrier media (e.g., acoustic, ultrasonic, etc.), as described elsewhere herein.

In some embodiments, remote control 303 may include at least one processing module, which may include at least one processor 504. A processing module may be configured to be coupled to and communicate with the UI or the at least one UI module. In some embodiments, a processing module may be configured to receive a signal from a UI module 402 based on a command provided by the user to remote control 303. A processing module may be configured to determine the user's command based on the signal received from the UI module, and generate one or more remote-control codes for controlling a device or system (e.g., device/system 301 of FIG. 3).

According to some embodiments, the processing module may be coupled to a radiation source or emitter. The processing module may be configured to control the radiation source in accordance with the one or more remote-control codes as generated. The radiation source may be configured to generate at least one radiation beam or projection based at least in part on the remote control code(s). The radiation beam as generated based at least in part on the remote control code(s) may, in turn, effect control of the corresponding device(s) or system(s) (e.g., device/system 301 of FIG. 3) controlled by remote control 303.

According to some embodiments, radiation source may include one or more IR radiation sources configured to generate an IR radiation beam or similar projection. For example, the radiation source may include one or more light emitting diodes (LEDs). However, this disclosure is not limited to the IR radiation source; for example, the radiation source may include other types of radiation sources for emitting other types of radiation.

Example Computer-Implemented Method(s)

Figure 4:
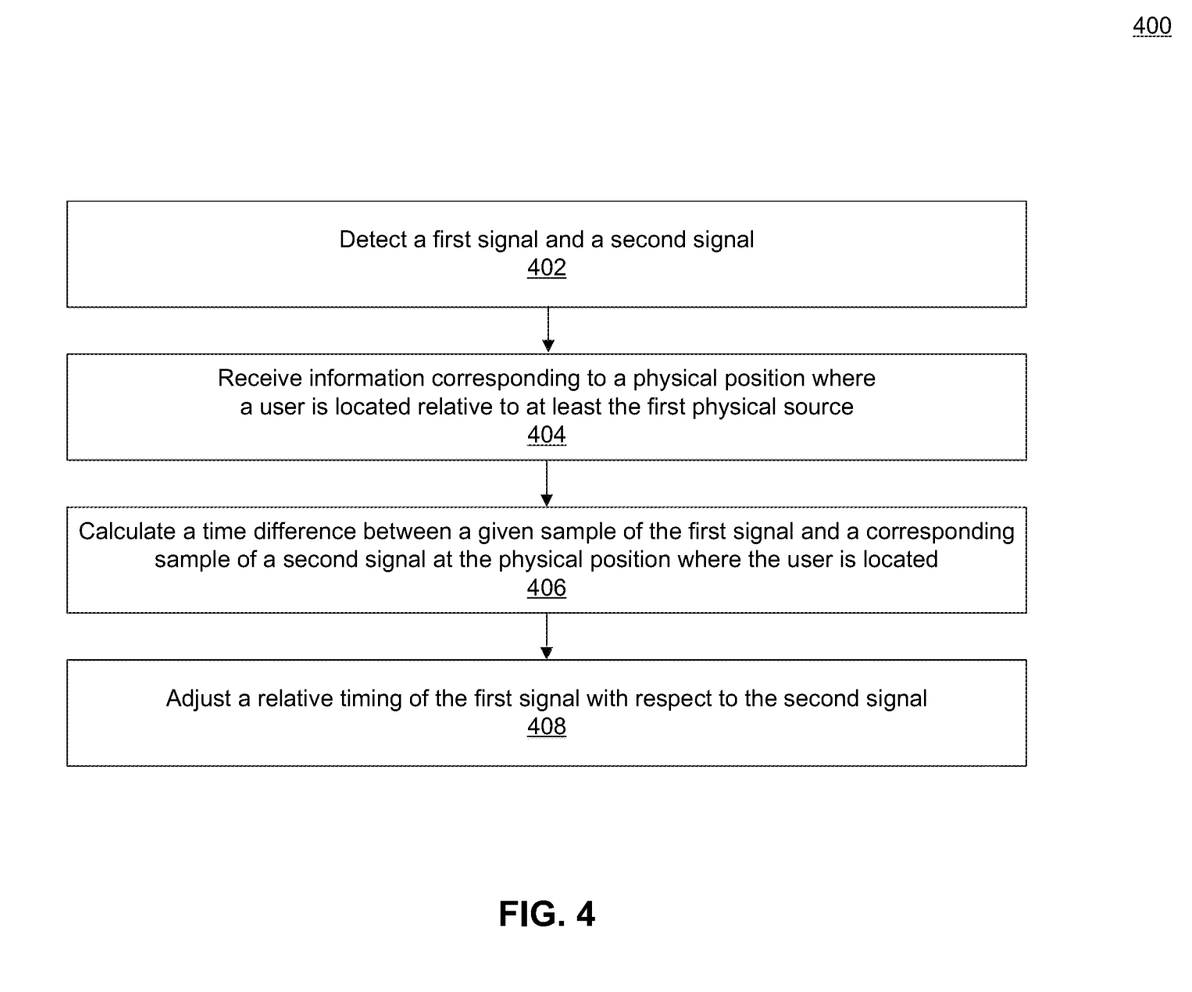
FIG. 4 is a flowchart illustrating a method implementing some of the enhanced techniques described herein, according to some embodiments of the present disclosure.

FIG. 4 is a flowchart illustrating a method 400 (process) for operation of the enhanced database platform integration techniques described herein, according to some embodiments. Method 400 may be performed by processing logic that may comprise hardware (e.g., circuitry, dedicated logic, programmable logic, microcode, etc.), software (e.g., instructions executing on a processing device), or a combination thereof.

Not all steps of method 400 may be needed in all cases to perform the enhanced techniques disclosed herein. Further, some steps of method 400 may be performed simultaneously, or in a different order from that shown in FIG. 4, as will be understood by a person of ordinary skill in the art.

Method 400 shall be described with reference to FIGS. 1-3, 5, and 6. However, method 400 is not limited only to those example embodiments. The steps of method 400 may be performed by at least one computer processor coupled to at least one memory device. An example processor and memory device(s) are described herein with respect to FIG. 5. In some embodiments, method 400 may be performed by components of systems shown in FIGS. 1-3 and 6, which may further include at least one processor and memory, such as those of FIG. 5.

In 402, at least one processor 504 may be configured (e.g., via program code or instructions stored in/on a non-transitory computer-readable storage medium or device) to detect a first signal and a second signal. The first signal may be a first audio signal corresponding to at least a first acoustic wave from at least a first physical source.

In some embodiments, the first physical source may be a sound-emitting transducer, such as at least one loudspeaker element or array of multiple loudspeakers, which may be communicatively coupled to at least one audio-signal source, such as a radio, television (TV), game console, set-top box (STB) or equivalent, general-purpose computer, such as a personal computer (PC), tablet, smartphone, or similar device, or the like, to name a few non-limiting examples. Additionally, or alternatively, the first physical source may include additional electronics, such as for signal processing, sourcing audio signals, computer networking, other computing, or the like, such as in a case of a smart speaker.

The first acoustic wave may be converted into one or more mechanical and/or electrical signals via at least one acoustic transducer for sound input, e.g., microphone, microphone array, loudspeaker element (speaker, monaural element) or loudspeaker array (e.g., stereo system, sound bar, line array, etc.) configured to convert acoustic waves into usable electrical signals (speakers configured for sound input rather than, or in addition to, sound output), microelectromechanical systems (MEMS) or nanoelectromechanical systems (NEMS) configured to detect at least one acoustic wave, or other device that may convert received sound (e.g., mechanical compression wave(s) in an ambient medium such as air or water) into electrical signals or other signals. From the signal output of the acoustic transducer, the first audio signal may be detected.

Detection may be performed by the at least one processor 504 employing at least one detection algorithm, for example, including noise filtering, pattern matching (for a specific pattern from a selected or predetermined audio sample), voice recognition, natural language processing (NLP), classifier, perceptron of any number of layers, or any artificial neural network (ANN), which may further include at least one convolutional neural network (CNN), which may be further configured for deep learning, in some embodiments. In similar fashion, other signals may be detected. In a case of other audio signals, such as a second audio signal, the first audio signal may be compared with the second audio signal to determine similarity of acoustic waveforms or other sound characteristics.

In some embodiments, signals (such as sensor outputs) may be quantized and digitized (binarized) by way of an analog-to-digital converter, and stored in at least one memory 508 device communicatively coupled with the at least one processor 504. To aid detection of signals, memory 508 may be configured to function as a buffer to store multiple samples for signal detection. Additionally, or alternatively, detection of signals may be performed remotely, in embodiments configured to send collected samples to a remote processing device configured to perform tasks for signal detection (e.g., pattern recognition, filtering, vectorization, classification, etc.).

Such remote processing may be beneficial for low-power or low-cost devices that may have access to a network for communication with other devices, such that the enabled remote processing may be relatively reliable and fast compared with on-board computing resources. Similar remote processing may further benefit from crowd-sourcing and/or other sources of up-to-date classification or training data sets, compared with what may be on-board a low-power or low-cost edge device that may be used for collecting sample data for signal detection, according to some embodiments.

In a case of audio-signal detection, one or more audio signals may be detected from at least one acoustic transducer output, which may be in a "listening" state, and which may cache or store samples locally for processing pattern recognition, or which may transmit samples to an external device, e.g., via a network, for remote processing. In some use cases, after a predetermined amount of time has elapsed or after a predetermined number of samples has been collected, older stored samples may be overwritten by new samples, such as in a ring buffer, or collected samples may be purged in batches, e.g., following successful detection of a particular signal, sample, or pattern of multiple samples, according to some embodiments.

Apart from audio signals, other signals may be detected, such as via other sensors, such as a photodetector. Such a photodetector may be any type of light sensor, light meter, or similar detector of electromagnetic radiation, particularly for detecting or measuring visible light, although other spectrum segments may be configured for detection. Photodetector may be implemented via at least one photoresistor, photodiode, light-emitting diode, or other mechanism, material, or other device that may convert received light (e.g., ambient light, or other light shining on photoelectric element(s) of photodetector) into one or more electrical signals. Such light detection may be performed by one or more photodetectors (e.g., in an array or image sensor), in such a way as to determine a state of an image or video being reproduced on a screen or other display, for example.

Other frequencies or forms of electromagnetic radiation, such as radio-frequency (RF) signals transmitted via electromagnetic waves or equivalent, may also be configured for signal detection in a similar manner. Additionally, or alternatively, apart from electromagnetic waves, relevant signals may be detected in other physical activity or similar environmental conditions, via other appropriate sensors communicatively coupled with processor 504 and applying suitable techniques similar to any of the other enhanced techniques described elsewhere herein.

In 404, processor 504 may be configured to receive information corresponding to at least a physical position where a user is located relative to at least the first physical source, according to some embodiments. The information corresponding to at least the physical position where a user is located relative to the first physical source may, in some further embodiments, include positioning information of the user and of at least first physical source, from which relative position information (e.g., distance, orientation or direction, barriers or obstructions, etc.) may be derived.

Additionally, or alternatively, a given device or system may include at least one sensor, such as a camera, rangefinder, or a combination thereof, to scan the surroundings of the given device. may include any variety of proximity sensor, e.g., SONAR, RADAR, LIDAR, or similar ToF measurement or detection of specific objects, or a scanning map of surrounding objects and/or terrain, any accessory to a smart TV or game console having similar or equivalent functionality, or any combination thereof. A rangefinder may also include embedded hardware and/or software and any suitable interface(s) for other modules, components, or computer hardware or software to interact with rangefinder 128 to request, process, or obtain data about scanning/mapping or ToF data determined by rangefinder, for example.

In addition to, or instead of, using loudspeakers and microphones for sound detection and identifying audio characteristics of a given audio system (sound system), a rangefinder may be used to perform (or assist in) characterization of surroundings, including positioning of any listening user(s) in a room, size or physical properties of a room, and any other acoustic characteristics, e.g., reverberation, resonance, echo, absorption, etc. A rangefinder may, using computer vision, image recognition, gesture recognition, and/or other pattern recognition, to identify at least one user and to derive the physical position where a given user is located relative to the first physical source, which may be in a known physical position separate from the physical position where the given user is located, to provide processor 504 the information corresponding to at least the physical position where the user is located relative to the first physical source.

In some embodiments, the user may be near (or holding) a remote-control device, which may be configured to communicate directly or indirectly with at least one processor 504, on-board the remote-control device and/or in another paired or accompanying device (e.g., STB, PC, console, etc.) that may be in communication with the remote-control device, continuously, continually, intermittently, or otherwise on an event-driven basis, for example.

The remote-control device and/or the at least one processor 504, may be used for determining information including at least a physical position where the remote-control device is located relative to at least the first physical source. In such use cases, it may be inferred that the location of the remote-control device is sufficiently close to the location of at least one user in order to infer the physical position where a given user is located.

For example, the remote-control device may be configured to receive information corresponding to the first audio signal and/or the first physical source, and may be configured to receive and process the first acoustic wave, detect an equivalent of the first audio signal, and determine, based at least in part on differences between known aspects of the first audio signal and the detected equivalent of the first audio signal, the relative position of the remote-control device with respect to the first physical source.

Here, an equivalent audio signal may be a signal, sample, or series of samples, for example, having sufficiently distinct characteristics to match with a pattern of another non-identical signal, sample, or series of samples, etc., such as by techniques of frequency spectral analysis, fingerprinting, or the like. Audio signals detected from acoustic waves may not be identical, even if they are reproduced from the same original signal, such as due to differences in physical sources, any ambient noise, any signal loss due to ambient characteristics of a room or other objects nearby, and so on.

However, the acoustic waves may retain enough distinguishing characteristics of the source audio signals so as to allow for detection of substantially similar or equivalent audio signals, which may be detected using any of the enhanced techniques described herein, including combinations or subcombinations of the above-mentioned non-limiting examples of detection algorithms or related techniques, e.g., spectral analysis, fingerprinting, noise filtering, pattern matching, or any other artificial intelligence (AI)-based processes, machine learning (ML), deep learning, ANN-based processing, convolution processing, NLP, or equivalent techniques.

Additionally, or alternatively, the remote-control device and/or at least one paired or accompanying device (e.g., STB, PC, console, etc.) may be equipped with at least one rangefinder, indoor positioning system, component thereof, or a combination thereof, to determine (or aid in determining) the information corresponding to at least the physical position where the user is located relative to at least the first physical source. Such information may be communicated via suitable channel(s) back to processor 504.

In 406, processor 504 may be configured to calculate a time difference between a given sample of the first signal and a corresponding sample of a second signal at the physical position where the user is located, based at least in part on the information. In some use cases, the time difference may be caused at least in part by a propagation delay of the first acoustic wave during its travel time from the first physical source to the user.

In some use cases, in which the second signal includes an audio signal having a similarly shaped waveform as the first audio signal, the time difference may be caused at least in part by physical separation of the first physical source from the second physical source and their respective physical positions or locations relative to that of the user, and/or by the first and second (audio) signals being delayed or desynchronized (out of sync) at one or both of the first and second respective physical sources.

Scenarios in which first and second audio signals have similar waveforms having delay and/or desynchronization may be in a multi-speaker, multi-channel, multi-room, or multi-system audio configuration, for example. In a system with multiple loudspeakers, which may be on multiple audio channels and/or located in multiple rooms, configured to reproduce the same output from the same source signal, the differences in the location of the speakers, delays in any different audio channels, or presence of any intervening barriers or other obstacles may create delays, echoes, or other acoustic interference that may degrade the quality of the sound that a user may hear.

A multi-system audio configuration may involve multiple independent audio systems or audiovisual systems, such as a home or business (e.g., retail store, restaurant, sports bar, exercise gym, etc.) that may have multiple separate radios, smart speakers, TV sets, etc. tuned to the same content at substantially the same time. Multi-system audio output may cause similar problems with the user's listening experience, but may also introduce additional delays (e.g., from differing upstream latency with input streams, independent controls, independent processing, etc.), potentially complicating any other types of audio calibration or other existing measures. As another example, when an environmentally aware remote-control system is listening across a house, a subwoofer in another room may be used to add low frequency/bass channel to an experience in the current listening environment.

In any of the above scenarios (e.g., multi-speaker, multi-channel, multi-room, multi-system audio), similar audio waveforms may arrive at different times in different signals, due to the same content playing at different times or with delays, for example, and may be a result of changing locations of speakers, channels, users, etc., affecting the overall channel balance and distribution. An imbalance or perceived delay may be confirmed following playback and receipt of a predetermined calibration sound, for example. In some embodiments, the predetermined calibration sound may be at a frequency below or above a normal audible range (e.g., infrasonic or ultrasonic frequencies) detectable by some devices.

Calibration of this nature may also thus be used across multiple rooms in proximity, so as to limit audio bleed-through (leak-through) effects when sounds at certain frequencies are audible through walls or other barriers. Such bleed-through may be undesirable in some situations, such has in homes where quiet space may be needed, e.g., to avoid disruptions that may affect other people in the vicinity. Once such calibrations are performed with a system, various audio profiles may be stored and/or loaded, to modify output settings (volume, frequency response/equalization, etc.), for example, to switch on a night mode in which bleed-through is reduced, or to switch off the night mode and return to a previous audio profile that does not have the same audio characteristics. Similarly, audio profiles may be scheduled on a recurring basis (e.g., a do-not-disturb mode, such as for nights or weekdays).

In the above manner, a given device, such as a remote-control device, a general-purpose computing device with at least one transducer and suitably configured software (e.g., a smartphone running a particular software application ("app") pre-loaded or downloaded thereon), or another calibration device with at least one transducer and suitable processing and communication abilities, for example, may be enabled to detect these signals as corresponding to acoustic waves from different physical sources engaged in playback of the same content.

Thus, when the given device is configured to communicate back to at least one of the sources of the signals, the given device may adjust (or instruct a device communicatively coupled with the corresponding source to adjust) playback of at least one of the signals such that the first signal and the second signal are perceived to be synchronized (in sync), at least at the physical position where the given device is located. The physical position where the given device is located may serve as a proxy for the physical position where a given user is located, for example. This adjustment is described further below with respect to 408.

Additionally, or alternatively, in some use cases, the second signal may include an electromagnetic wave corresponding to a second physical source video signal. In some embodiments, this electromagnetic wave may be an emission or projection of visible light, such as from a display of video content rendered from a video signal, e.g., on a monitor, television screen, cinematic projector (movie projector), projector screen, heads-up display (HUD), virtual reality (VR) system including at least one headset and/or secondary display, etc. In some embodiments, the second signal including visible light may include a pattern of oscillations in visible light, e.g., flashing on/off (with respect to an ambient-light noise floor) at a specified rate or pattern over a specified time period, changing wavelengths in a specified pattern over a specified time period, etc. In some further use cases, the second signal may include a separate projection of electromagnetic radiation other than visible light, e.g., infrared (IR), ultraviolet (UV), or RF signal, detectable by certain devices for calibration of one or more audiovisual systems. RF or IR signals may be understood as being usable with various general-purpose remote-control devices or systems, universal remote-control devices or systems (e.g., for home automation, or other network-based devices for remote control or home automation.

Further examples of an RF signal may include at least one electromagnetic wave in compliance with at least one wireless communications standard (e.g., a version of IEEE 802.11 (Wi-Fi) or equivalent, Bluetooth, etc.), or with a comparable proprietary or non-standard implementation of similar wireless functionality. Moreover, relative signal strength of such electromagnetic waves may be analyzed, from which distances may be estimated, e.g., using techniques of Wi-Fi signal analysis, Bluetooth signal analysis, or the like, such as estimating by power reduction. Additionally, or alternatively, analysis of light levels, spectral analysis, or any combination thereof, may further be used as a part of passive environmental identifiers, based on which system output may be modified depending on user location.

Where the first signal is an audio signal and the second signal is not an audio signal (e.g., electromagnetic wave), the second signal may function as a cue for synchronization of a source audio stream with a corresponding source video stream, for example. Thus, at a given device configured to receive the first and second signals, per some of these use cases as described herein, the given device may be configured to communicate back to at least one of the sources of the first or second signals.

The given device, in turn, may adjust (or instruct a device communicatively coupled with the corresponding source to adjust) playback of at least one of the signals such that the first signal and the second signal are perceived to be synchronized (in sync), at least at the physical position where the given device is located. In a case of an audio stream being delayed or desynchronized from a video stream, this condition may be perceived by a user such as when a video of speaking (e.g., showing faces with moving lips) does not appear to match with timing of the spoken words as heard by the user. In terms of synchronization of first and second signals, the given device, according to some embodiments, may be configured to match a predetermined pattern of a sound for an explosion as the first signal with a corresponding flash or visible color pattern for a video of the explosion, as projected by a display device in the form of visible light at certain wavelengths and intensities.

The second signal, corresponding to electromagnetic radiation, may generally travel faster than the first signal, corresponding to an acoustic wave. However, the second signal may be linked with playback of a video stream, which may incur additional delays (e.g., limitations of network throughput, network latency, processing for decompression and/or decoding, etc.), compared with the first signal corresponding to a first acoustic wave, which may be linked with playback of an audio stream, such as a soundtrack of the video stream.

The given device may accordingly account for physical propagation delays of different physical media for corresponding signals, as well as accounting for processing delays associated with producing or playing back content associated with such signals. Thus, the given device may be content-aware (e.g., mapping specific signals to specific parts of a content instance and/or a content manifest), media-aware (e.g., differentiating and accounting for compression levels, bitrates, signal types, etc.), or a combination thereof. Additionally, or alternatively, aside from being detectable or discoverable by the given device itself by way of on-board processing capability, e.g., of processor 504, information associating signals with content, e.g., associating audio fingerprints, light signatures, etc., with content timestamps, or associating signals with media may be communicated to the given device by way of metadata that may be encoded within the first and/or second signals, or that may be transmitted to the given device via a separate metadata channel, for example. These different types of "awareness" for the given device may further aid processing to detect certain signal patterns, and/or to adjust aspects of the signals, as described further below with respect to 408.

When the given device is configured to communicate back to at least one of the sources of the signals, the given device may adjust (or instruct a device communicatively coupled with the corresponding source to adjust) playback of at least one of the signals such that the first signal and the second signal are perceived to be synchronized (in sync), at least at the physical position where the given device is located. The physical position where the given device is located may serve as a proxy for the physical position where a given user is located, for example. This adjustment is described further below with respect to 408.

In 408, processor 504 may be configured to adjust a relative timing of the first signal with respect to the second signal, at the physical position where the user, responsive to the calculating. For example, a positive delay (pause) or negative delay (skip) may be introduced into the first signal, even if the second signal is not directly controllable. Alternatively, some configurations may allow for control of the first signal or the second signal, and positive delay may be preferred for the leading signal. Any of these arrangements may be considered to be an adjustment to the relative timing of the first signal with respect to the second signal. Additional examples are described further herein.

In response to a difference (e.g., time difference) being calculated or evaluated per 406, then when a given device (e.g., smart remote-control device, smartphone, remote sensor, etc.) is configured to communicate back to at least one of the sources of the signals, the given device may adjust (or instruct a device communicatively coupled with the corresponding source to adjust) playback of at least one of the signals such that the first signal and the second signal are perceived to be synchronized (in sync), at least at the physical position where the given device is located. The physical position where the given device is located may serve as a proxy for the physical position where a given user is located, for example.

In some embodiments, the adjustment instructed and/or performed as a result of 408 may be for an adjustment to be executed during playback of a given content instance. For example, such an adjustment may be configured so as not to require a user to perform any special calibration sequence, which may distract the user (and potentially other users) where manual intervention may be required, and which may otherwise interrupt or add distracting audio (or video or other activity) to the ongoing playback of the given content instance.

Thus, per 408, adjustment may be part of an automatic calibration sequence, which may be configured to occur in the background of content playback, unnoticed by users. For example, according to some embodiments, a predetermined calibration sound may be played back at the first physical source as the first signal. The predetermined calibration sound may be played back may be tuned to an existing audio pattern of the specific content instance being played back, such as in the form of a modification to the audio playback as a barely perceptible or psychoacoustically imperceptible change to the source audio of the content instance. Additionally, or alternatively, the predetermined calibration sound may be played back. at a frequency below or above a normal audible range (e.g., subsonic or ultrasonic frequencies) detectable by certain devices, but not by human listeners. Other audio properties or parameters may be tuned or configured via similar or equivalent means.

In an example of synchronizing multiple acoustic waves representing unsynchronized (delayed or desynchronized) playback of the same content from different physical sources, at the physically positioned location of the given device, the given device may be configured to communicate with at least one of the first and second physical sources of the different acoustic waves and adjust (or instruct adjustment of) playback accordingly.

In some embodiments, adjusting (or a transmitter configured to transmit instructions for adjusting) playback of independently adjustable corresponding audio signals for the playback may involve shifting (or transmitting instructions for shifting) the relative timing of the playback audio signals as played back by at least one of the first or second physical sources. For example, even if both physical sources are playing back the same content at substantially the same absolute time, the perceived time of playback at the position of the given device (or the user) may vary as a factor of physical position where the given device or the user is located relative to either physical source of the respective acoustic waves corresponding to playback.

Thus, by having at least one of the physical sources adjust playback of the content instance, such as by shifting relative timing (e.g., pausing playback to introduce delay of one source, skipping ahead to reduce delay of the other source, momentarily adjusting playback speed to match effective delay of either physical source, so as to eliminate the perceived delay between the physical sources from a reference point of the given device or the user).

If playback is automatically adjustable by a given device only at the first physical source (e.g., no control via hardware, software, upstream, etc., of a second audio signal or second physical source of a second acoustic wave), then playback may be adjusted accordingly, including shifting timing of the first audio signal backward or forward to increase or decrease delay of playback relative to the second audio signal. If playback can be automatically adjusted at either of the first or second physical sources, then either source may shift timing in a suitable manner autonomously, if capable of detecting and adjusting the relevant signals; or playback at either physical source may be instructed to delay appropriately by the given device if possible.

For example, where there is a relative delay between two audio streams (as detected by the corresponding first and second audio signals), the audio stream that is leading may be delayed (suddenly or gradually) so as to match the timing of the audio stream that is lagging, assuming that both audio streams (or at least the leading audio stream) may be controlled independently, such as autonomously or in an automated manner via the given device (e.g., a remote-control device as a proxy for a user, but without necessarily requiring manual intervention by the user).

While users may prefer the approach of adding delay to a leading stream rather than causing a lagging stream to catch up (e.g., skipping some playback, or gradually speeding up the playback momentarily), the latter scenario of causing the lagging stream to catch up to the leading stream may be forced by a lack of control over the leading stream versus the lagging stream, with the end result still being desirable over maintaining a persistent delay or otherwise unsynchronized or desynchronized audio.

Such a lack of control over a given stream may be due to the uncontrolled stream being delivered via a third-party hardware or software platform that lacks integrations with the given device or with another playback device capable of interacting with the given device, for example. In some use cases, encrypted connections, pass-through streams (e.g., with audio return channel (ARC) or S/PDIF standards), and/or third-party channel applications may account for some reasons behind some streams lacking control for the given device.

Where the first signal is an audio signal and the second signal is not an audio signal (e.g., electromagnetic wave), the second signal may function as a cue for synchronization of a source audio stream with a corresponding source video stream, for example. Thus, at a given device configured to receive the first and second signals, per some of these use cases as described herein, the given device may be configured to communicate back to at least one of the sources of the first or second signals.

The given device, in turn, may adjust (or instruct a device communicatively coupled with the corresponding source to adjust) playback of at least one of the signals such that the first signal and the second signal are perceived to be synchronized (in sync), at least at the physical position where the given device is located. In a case of an audio stream being delayed or desynchronized from a video stream, this condition may be perceived by a user such as when a video of speaking (e.g., showing faces with moving lips) may not appear to match with timing of the spoken words of the soundtrack as heard by the user.

For example, in terms of synchronization of first and second signals, the given device, according to some embodiments, may be configured to match a predetermined pattern of a sound for an explosion as the first signal with a corresponding flash or visible color pattern for a video of the explosion, as projected by a display device in the form of visible light at certain wavelengths and intensities.

Example Computer System

Various embodiments may be implemented, for example, using one or more known computer systems, such as computer system 500 shown in FIG. 5. For example, the media device 106 may be implemented using combinations or sub-combinations of computer system 500. Also or alternatively, one or more computer systems 500 may be used, for example, to implement any of the embodiments discussed herein, as well as combinations and sub-combinations thereof.

For example, in some embodiments, processing module 204, any of devices/systems 301, remote control 303, or remote-control device 600, may be implemented using combinations or sub-combinations of computer system 500. Additionally, or alternatively, one or more operations or steps of method 400 may be implemented using combinations or sub-combinations of computer system 500.

Computer system 500 may include one or more processors (also called central processing units, or CPUs), such as a processor 504. Processor 504 may be connected to a bus or communication infrastructure 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. With capabilities of general-purpose computing on graphics processing units (GPGPU), the GPU may be useful in various other applications. The GPU may have a parallel structure that is efficient for parallel processing of large blocks of data, such as mathematically intensive data common to computer graphics applications, images, videos, vector processing, array processing, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Wireless connections to the Internet may be implemented via standard protocols (e.g., CDMA, GSM, GPRS/EDGE, 2G, 2.5G, 3G, 4G LTE, 5G, 5G-NR, 6G, or equivalent), Control logic and/or data may be transmitted to and from computer system 500 via communications path 526.

Computer system 500 may also be any of a personal digital assistant (PDA), desktop workstation, laptop or notebook computer, netbook, tablet, smart phone, smart watch or other wearable, appliance, part of the Internet-of-Things (IoT), and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer-useable or computer-readable storage medium having control logic (software or instructions) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments may operate with software, hardware, and/or operating system implementations other than those described herein.

Example Remote-Control Device

Various embodiments may be implemented, for example, using one or more known computer systems, such as computer system 500 shown in FIG. 5, configured in an embedded system for efficient power consumption in a handheld form factor. For example, in one embodiment, remote-control device 600 may be implemented using combinations or sub-combinations of computer system 500, including at least one processor 504 and memory 508.

Figure 6:
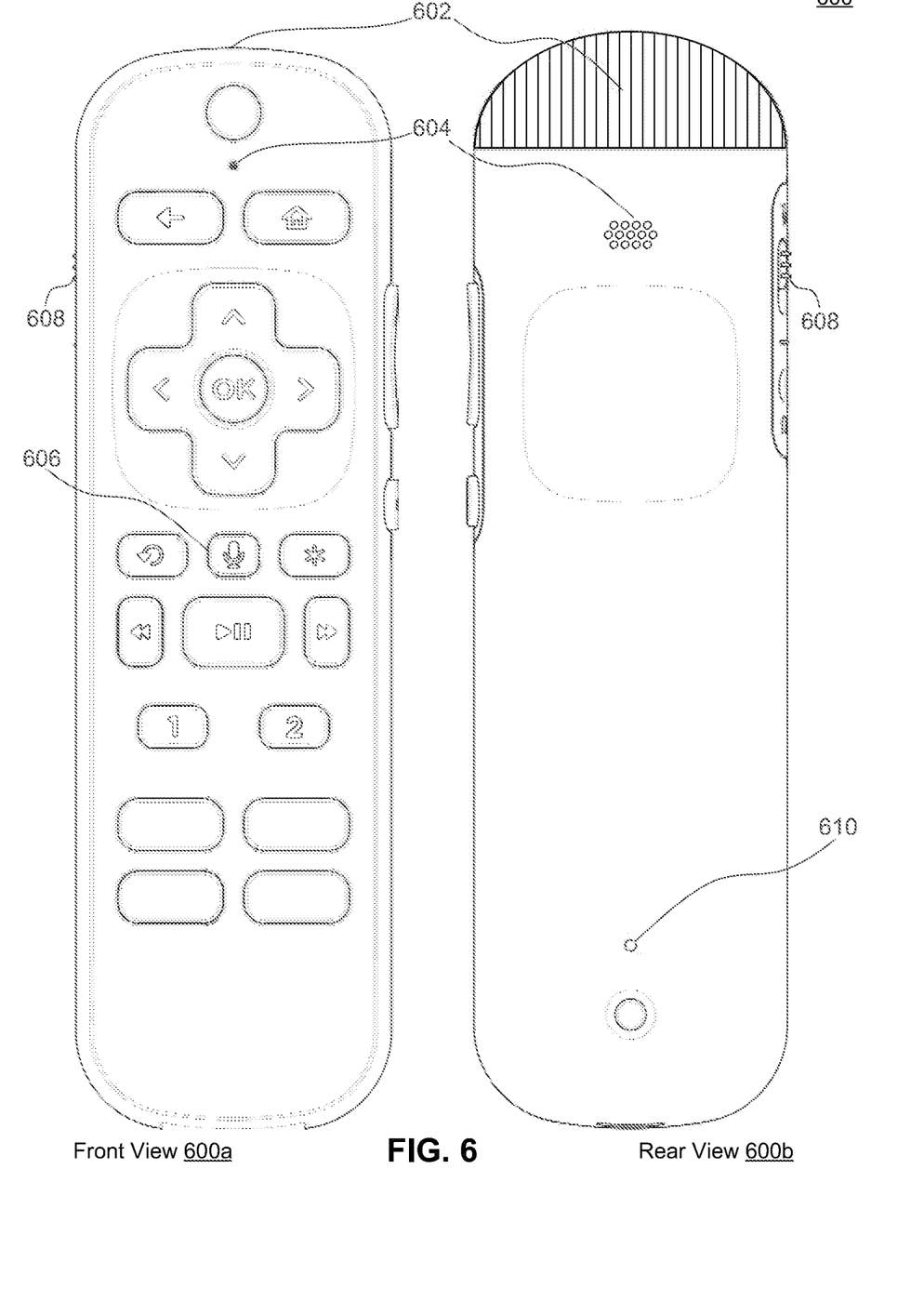
FIG. 6 illustrates an example remote-control device, according to some embodiments of this disclosure.

As shown in FIG. 6, with front view 600a and rear view 600b as orthogonal projections of remote-control device 600, an example embodiment may include an outer body molded or otherwise formed from one or more parts of any of various solid materials of varying hardness, e.g., metal, wood, glass, rubber, plastic, etc. In an embodiment of a plastic body, materials forming one or more parts may include synthetic resins such as acrylonitrile butadiene styrene (ABS), polybutylene terephthalate (PBT), ultrapolymer polyethylene (UHPE), polyphenylene sulfide (PPS), polyarylate (PAR), polyacetal (POM), polyamide (PA), polycarbonate (PC), polyether sulfone (PES), polyether ether ketone (PEEK), or the like.

Certain parts of the body may be made of different materials having different physical properties. For example, at a distal end of the body of remote-control device 600, a lens 602 may be integrated, snap-fit, adhesively bonded, welded, thermally fitted, or otherwise affixed to or formed in part of the body, such as a rounded end of the bottom half of the body shown by the shaded portion of the rear view 600b corresponding to lens 602. Other embodiments may have multiple such lenses 602 in any other part of the body.

Lens 602 may be composed of a material having physical properties that allow transmissibility of electromagnetic waves in and/or out through lens 602, at least at certain wavelengths. Some embodiments of lens 602 may include filters, collimators, and/or directional guides for certain wavelengths of light or other electromagnetic waves, including UV or IR beams or projections.

Disposed inside the body of remote-control device 600, near an inside face of lens 602, may be at least one sensor, at least one emitter, or a combination thereof. Lens 602 may be optically shaped or formed in such a way as to guide electromagnetic waves from outside the body, at different angles, toward the at least one sensor. Additionally, or alternatively, lens 602 may be optically shaped or formed in such a way as to guide electromagnetic waves produced by the at least one emitter in specific direction(s) or pattern(s) through lens 602 to the outside of the body.

Additionally, or alternatively, disposed at various positions on the front and/or rear parts of the body of remote-control device 600, may be any number of various holes 604 of different shapes, sizes, and groupings, in such configurations as may allow acoustic waves to pass through the body to and/or from any acoustic transducer(s) inside the body of remote-control device 600. Holes 604 may be positioned and/or shaped in suitable manner to allow for improved directional detection of sound by transducers such as microphones or equivalent. Additionally, or alternatively, holes 604 may be position and/or shaped in suitable manner to allow for sound output, such as for computer-generated voice notifications and/or audio playback (e.g., soundtracks of multimedia content, music, etc.).

Moreover, various embodiments may have any number of buttons disposed at least on the front, and also the rear, in some embodiments, of the body of remote-control device 600. The buttons may be formed of a relatively hard or soft thermoplastic resin, rubber, silicone, or similar material, and may interface with at least one membrane or other type of sensors or mechanical switches under the buttons. At least one button 606 may control input of certain sensors, such as a microphone. In some embodiments, a microphone may be on or configured to receive and process input signals regularly, but may change a configuration of how the input signals are processed, in response to a user pressing and/or holding a given button 606.

Additionally, or alternatively, at least one toggle switch 608 may be disposed on any part of the body of remote-control device 600, such as laterally, on at least one side, as shown in FIG. 6. Toggle switch 608 may have similar function as leaving button 606 depressed or otherwise. Toggle switch 608 may come in a variety of form factors (e.g., slider, rocker, knob, lever, tumbler, dual-inline package (DIP), push-button, etc.) and may be configured to allow a user to change any number of settings using hardware circuitry. For example, toggle switch 608 may allow a user to set a night mode, as described elsewhere herein. As another example, toggle switch 608 may be configured to operate as a hardware kill-switch for certain sensors or processing units, e.g., allowing for a privacy mode.

Further, as an alternative to, or in combination with, lens 602, at least one light pipe 610 may be used for similar purposes as lens 602, and/or may be configured to function as an indicator light, such as for aiding a user in configuring or troubleshooting other on-board processing elements, in some embodiments. In some embodiments, at the location of light pipe 610 may be a sensor or emitter flush with the body of remote-control device 600, allowing for less material and design complexity.

While remote-control device 600 as shown in FIG. 6 depicts one example embodiment, which may be used to implement remote control 303 or other aspects of the enhanced technology described herein, it is to be appreciated that other device form-factors may be used to implement at least the same functionality or equivalent functionality. Existing commercially available platforms for handheld remote-control devices may be equipped or retrofitted with specific sensors, emitters, processors, and/or program logic configured to implement the enhanced techniques disclosed in this document.

Alternatively, various general-purpose computing platforms, including handheld devices such as smartphones or tablet computers, may be sold with various environmental sensors, and may be configured or programmed at various levels of an implementation stack (hardware, firmware, system-level software, application-level software, etc.) to implement processing capabilities that may carry out the enhanced techniques described in this document and recited in the claims that follow at the end of this document. FIG. 6 is not intended to be limiting, and a remote-control device in accordance with an apparatus as may be recited in the claims below is not limited to a form factor resembling that shown in FIG. 6.

CONCLUSION

It is to be appreciated that the Detailed Description section, and not any other section, is intended to be used to interpret the claims. Other sections may set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. A computer-implemented method, comprising:
detecting, by at least one computer processor, based on a pattern of audio characteristics of audio content from a first device mapped to a pattern of video characteristics of video content from a second device, the audio content;
identifying, based on a location of the first device and a time difference between when a portion of the audio content is detected and when a portion of the video content is detected, a location of a third device; and
sending an instruction to the first device that causes a relative timing of the audio content to adjust with respect to the video content so that another portion of the first type of audio content indicative of a content item is perceived at the location of the third device contemporaneous with another portion of the video content indicative of the content item.

2. The computer-implemented method of claim 1, wherein the first device and the second device comprise at least one of a speaker, a radio, a display, or a content playback device.

3. The computer-implemented method of claim 1, wherein the pattern of audio characteristics comprises at least one of a pattern of audio frequencies, a pattern of audio amplitudes, or a pattern of sound effects, and wherein the pattern of video characteristics comprises at least one of a pattern of visible light, a pattern of optical wavelengths, a pattern of displayed colors, a pattern of optical effects, or a pattern of light signatures.

4. The computer-implemented method of claim 1, wherein the third device comprises at least one of a remote-control device, a mobile device, or a content playback device.

5. The computer-implemented method of claim 1, wherein a device type of the first device matches a device type of the second device.

6. The computer-implemented method of claim 1, wherein a first timing of the audio content is adjustable independently of a second timing of the video content, and wherein the instruction sent to the first device comprises an instruction to shift the first timing.

7. The computer-implemented method of claim 1, wherein the identifying the location of the third device is further based on calculating the time difference according to data quantifying a room in which the third device is located.

8. The computer-implemented method of claim 1, further comprising confirming the location of the third device based on data from at least one of a rangefinder or an indoor positioning system, wherein the sending the instruction to the first device is further based on the confirming the location of the third device.

9. A non-transitory computer-readable medium having instructions stored thereon that, when executed by at least one computing device, cause the at least one computing device to perform operations comprising:
   detecting, based on a pattern of audio characteristics of audio content from a first device mapped to a pattern of video characteristics of video content from a second device, the audio content;
   identifying, based on a location of the first device and a time difference between when a portion of the audio content is detected and when a portion of the video content is detected, a location of a third device; and
   sending an instruction to the first device that causes a relative timing of the audio content to adjust with respect to the video content so that another portion of the audio content indicative of a content item is perceived at the location of the third device contemporaneous with another portion of the video content indicative of the content item.

10. The non-transitory computer-readable medium of claim 9, wherein the first device and the second device comprise at least one of a speaker, a radio, a display, or a content playback device.

11. The non-transitory computer-readable medium of claim 9, wherein a first timing of the audio content is adjustable independently of a second timing of the video content, and wherein the instruction sent to the first device comprises an instruction to shift the first timing.

12. The non-transitory computer-readable medium of claim 9, wherein the third device comprises at least one of a remote-control device, a mobile device, or a content playback device.

13. The non-transitory computer-readable medium of claim 9, wherein a device type of the first device matches a device type of the second device.

14. The non-transitory computer-readable medium of claim 9, wherein the identifying the location of the third device is further based on calculating the time difference according to data quantifying a room in which the third device is located.

15. A system, comprising:
   one or more memories;
   at least one processor coupled to at least one of the memories and configured to perform operations comprising:
   detecting, based on a pattern of audio characteristics of audio content from a first device mapped to a pattern of video characteristics of video content from a second device, the audio content
   identifying, based on a location of the first device and a time difference between when a portion of the audio content is detected and when a portion of the video content is detected, a location of a third device; and
   sending an instruction to the first device that causes a relative timing of the audio content to adjust with respect to the video content so that another portion of the audio content indicative of a content item is perceived at the location of the third device contemporaneous with another portion of the video content indicative of the content item.

16. The system of claim 15, wherein the first device and the second device comprise at least one of a speaker, a radio, a display, or a content playback device.

17. The system of claim 15,
   wherein the pattern of audio characteristics comprises at least one of a pattern of audio frequencies, a pattern of audio amplitudes, or a pattern of sound effects, and
   wherein the pattern of video characteristics comprises at least one of a pattern of visible light, a pattern of optical wavelengths, a pattern of displayed colors, a pattern of optical effects, or a pattern of light signatures.

18. The system of claim 15, wherein the third device comprises at least one of a remote-control device, a mobile device, or a content playback device.

19. The system of claim 18, wherein a device type of the first device matches a device type of the second device.

20. The system of claim 15, wherein a first timing of the audio content is adjustable independently of a second timing of the video content, and wherein the instruction sent to the first device comprises an instruction to shift the first timing.

21. The system of claim 15, the operations further comprising confirming the location of the third device based on data from at least one of a rangefinder or an indoor positioning system, wherein the sending the instruction to the first device is further based on the confirming the location of the third device.

22. The non-transitory computer-readable medium of claim 9, the operations further comprising confirming the location of the third device based on data from at least one of a rangefinder or an indoor positioning system, wherein the sending the instruction to the first device is further based on the confirming the location of the third device.

* * * * *